US005517763A

United States Patent [19]

Schilling et al.

[11] Patent Number: 5,517,763

[45] Date of Patent: May 21, 1996

[54] HAND CIRCULAR SAW WITH SWINGING PROTECTIVE HOOD AND MITER ANGLE ADJUSTING DEVICE

[75] Inventors: Rainer Schilling, Stuttgart; David Matzo, Leinfelden-Echterdingen, both of Germany

[73] Assignee: Robert Bosch GmbH, Stuttgart, Germany

[21] Appl. No.: 376,102

[22] Filed: Jan. 20, 1995

[30] Foreign Application Priority Data

Feb. 2, 1994 [DE] Germany .......................... 44 03 186.6

[51] Int. Cl.$^{6}$ .......................... B23D 45/16; B23D 45/14; B27B 9/00

[52] U.S. Cl. .................................... 30/376; 30/377

[58] Field of Search ............................ 30/371, 375, 376, 30/377, 390, 391

[56] References Cited

U.S. PATENT DOCUMENTS 3,087,519 4/1963 McCarty et al. .......................... 30/376
4,856,394 8/1989 Clowers ................................ 30/376 X
4,982,501 1/1991 Sauerwein et al. ...................... 30/376
5,010,651 4/1991 Techter et al. ........................ 30/375 X
5,414,935 5/1995 Braunbach et al. ...................... 30/376

FOREIGN PATENT DOCUMENTS 171991 2/1986 European Pat. Off. ................ 30/376

*Primary Examiner*—Douglas D. Watts
*Attorney, Agent, or Firm*—Michael J. Striker

[57] ABSTRACT

A hand circular saw has a saw blade rotatable about a saw shaft axis, a housing which receives the saw shaft axis, a base plate which supports the housing and is movable with the latter, the housing being turnable relative to the base plate about two axes extending perpendicular to one another independently from one another and arrestable, the axis including a first axis which extends parallel to the saw shaft axis and operates for adjusting a cutting depth, and a second axis which extends both parallel to the base plate and to the saw blade and is used for adjustment of a miter angle, a coulisse having a circular arc-shaped guiding track and a coulisse block which determine a position of the second axis. The coulisse has a coulisse part which is fixedly connected with the base plate and has an upwardly curved ring portion which is also arranged on the base plate. The ring portion has a convex side which has the guiding track extending upwardly and has a center of curvature coinciding with the second axis used for adjustment of the miter angle.

15 Claims, 4 Drawing Sheets

HAND CIRCULAR SAW WITH SWINGING PROTECTIVE HOOD AND MITER ANGLE ADJUSTING DEVICE

BACKGROUND OF THE INVENTION

The present invention relates to a hand circular saw with a swinging protective hood and a miter angle adjusting device.

One of such hand circular saws is disclosed in U.S. Pat. No. 4,856,394. The hand circular saw disclosed in this reference has a swinging protective hood, a cutting depth adjusting device and a miter angle adjusting device. The cutting depth is determined by the distance of the projection of the saw blade under the base plate. For its adjustment the saw blade is turned up and down relative to the base plate about an axis extending parallel to the rotary axis of the saw blade and is arrested in a desired position by clamping means relative to the base plate. The base plate protects the hand circular saw on a workpiece, so that an angular adjustment of the saw blade relative to the workpiece is obtained not in a freely hanging manner, but instead in a supported manner. In this construction the adjusting devices impart to the saw blade a high freedom degree with accurate guidance relative to the workpiece.

Hand circular saws with swinging protective hoods are used predominantly for displacement sawing and only as an exception for plunge sawing. During the displacement sawing the cutting depth is preselected, and the housing is arrested relative to the cutting depth guiding bucket with the preselected value. The cutting depth adjusting device is loaded in their bearings and guides only a little, namely only by the weight force of the saw.

In contrast, during the plunge sawing, in addition to the weight forces also the reaction forces act on the cutting depth adjusting device due to the tool engagement with the workpiece. There is therefore the danger that the saw blade during the upward and downward swinging is displaced or tilted unintentionally from its plane perpendicular to the base plate. Therefore deviations from the nominal position can lead to canting of the saw blade in the saw gap and as a result undesirable high quantity of chips is removed.

The miter angle adjusting device during "standard horizontal cut" and during plunge sawing are subject to the same conditions as the cutting depth adjusting device. For adjusting the miter angle the saw is turned about a turning axis parallel to the saw blade and to the base plate. The bearing or coulisse which forms the turning axis are arranged at a relative great distance from one another of at least approximately 200 mm. Moreover, the gripping point of the hand of the operator during the inclined adjustment of the hand circular saw is located far from the bearing or the bearings. Therefore a long arm is produced, and as a result the adjusting forces during the incline adjustment produce high rotary or bending moments on the hand circular saw. They can lead to twisting or canting of the parts which carry the bearing, so that the hand circular saw is turned in a bearing by 45° and in the opposite bearing by 43°. Because of this difference for adjustment of the miter angle, disturbing inclined positions of the saw blade relative to the base plate or to the predetermined cutting plane occur. Such inclined positions lead to inclined cutting edges and thereby to faulty saw cutting. This danger is characteristic especially for hand circular saws with coulisse guides for miter angle adjustment, which have the advantage of dispensing with a physical turning axis formed by the bearing block or rotary pin, wherein for the same tool engaging line at all miter angles the turning axis extends under the base plate or on the workpiece.

The known coulisses which form the bearing are composed of a metal sheet with a punched guiding slot which forms a guiding track for a coulisse block. The width of the guiding track is determined by the thickness of the metal sheet. Thereby a high surface pressure is produced in the guiding slot, and as a result, a high friction occurs which leads to difficulties and/or high wear.

The known hand circular saws have relatively exactly guiding coulisse with a guiding track which is formed by a guiding slot of a predetermined width and guides the coulisse block in a substantially gap-free manner. These coulisses however have exclusively guiding functions and the coulisse block is not clampable in them.

For the production of the guiding slots and coulisse blocks very narrow tolerances must be provided. Therefore, the machining expense is high. Moreover, the guiding slot and the coulisse block are wear sensitive. The higher the wear, the greater is the guiding gap between the coulisse block and the guide, and the greater the deviation of the position of the turning axis from its ideal position.

For arresting the turning axle, in addition to the coulisse, clamping means in form of additional clamping coulisse is arranged between the housing and the base plate. Threaded bolts which extend into the gap and are clampable by clamping screws are fixedly connected with the housing and guided in the clamping slow with coarse tolerances. They must follow the movement provided by the guiding coulisse so as to clamp each desired miter angle position.

The threaded bolts described hereinabove are arranged in general parallel to the turning axis. Thereby the clamping screw is accessible for the operator only from the side. Moreover, it is conventional to read the scale which is mounted on the clamping coulisse for indicating the miter angle only from the front or from the rear, and not from above, from the view of the operator. This makes difficult the controlled adjustment and preselection of a miter angle.

SUMMARY OF THE INVENTION

Accordingly, it is an object of the present invention to provide a hand circular saw of the above mentioned general type, which avoids the disadvantages of the prior art.

In keeping with these objects and with others which will become apparent hereinafter, one feature of the present invention resides, briefly stated, in a hand circular saw in which an upwardly curved ring portion of a coulisse part fixedly connected with the base plate carries a guiding track with its convex side which faces upwardly, and its center of curvature is congruent with an axis serving for adjustment of the miter angle.

When the hand circular saw is designed in accordance with the present invention, the high accuracy coulisse which forms the axis for adjustment of the miter angle is composed of simply and inexpensibly adjustable and mountable parts. The miter angle adjustment is arranged in ergonomically favorable manner. Because of the low gap and great guiding and sliding surfaces, jerk-free miter angle adjustments are possible, and the saw blade is always positioned extremely accurately.

Because of the quasi gap-free guidance the miter plunge cuts are produced especially accurately with flat, channel-free cutting surfaces with minimal material removal and with high efficiency.

With the coulisse designed in accordance with the present invention it is not necessary to provide high manufacturing accuracy since the width of the guiding slot or the guiding gap is variable by turning of the chuck. Thereby the wear dependent guiding gap can be compensated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
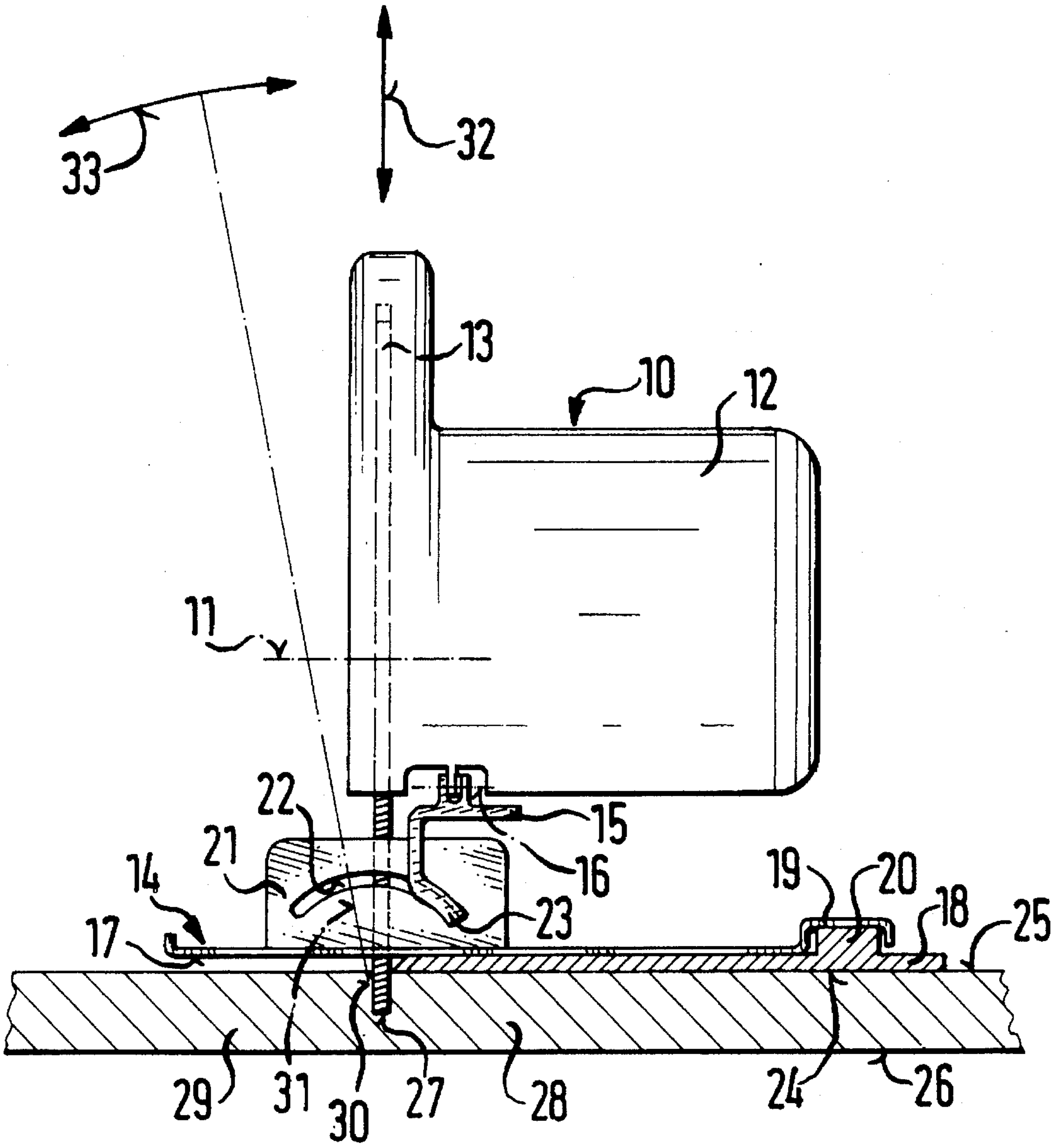
FIG. 1 is a principal view showing a hand circular saw with a miter angle adjusting device in accordance with the prior art, with a guiding rail in working position opposite to the displacement direction.

FIG. 1 shows a standard hand circular saw in accordance with the prior art on front view, in other words on a view as seen opposite to the displacement direction. The hand circular saw is identified with reference numeral 10 and its adjustment mechanism which is also utilized in the inventive hand circular saw can be clearly recognized.

Since in FIG. 1 the rear region of the hand circular saw which is symmetrical to the front region is covered by the front part and therefore is not visible, the not visible parts are identified with references in brackets to improve understanding of the description.

The hand circular saw 10 has a saw blade 13 which is rotatable about a saw shaft axis 11 in a housing 12. The housing 12 is turnable on a turning bridge 15 together with it relative to a base plate 14. Moreover, it is arranged vertically turnable on the turning bridge 15 in a schematically shown pin bearing with an axis extending parallel to the saw shaft axis 11 (known as a pivot hinge) for adjustment of the cutting depth. Two coulisses 21 (21') are arranged on the base plate 14 in alignment with one another in the displacement direction. They have circular arc-shaped, gap-like guiding tracks 22, (22') with a radius of curvature 31, (31'), and the two ends of the turning bridge 15 which serve as coulisse blocks 23, (23') are guided in them.

The hand circular saw 10 is placed with the lower side 17 of its base plate 14 on a guiding rail 18. The base plate 14 is provided with a guiding groove 19 for engaging a guiding rib 20 of the guiding rail 18. The guiding groove 19 is arranged on the lower side 17 near a longitudinal edge, and extends parallel to the displacement direction. The guiding rail 18 is located with its lower side 24 on the upper surface 25 of a plain workpiece 26. One workpiece 26 has a cutting joint 27 produced by the saw blade 13. The cutting joint 27 separates the workpiece 26 into a product side 28 and a refuse side 29.

The curvature center determined by the arcuate guiding tracks 22, (22') forms a turning axis 30 parallel to the saw blade 13 and the base plate 14 for adjusting the miter angle. Not shown arresting means are provided between the coulisse block 23, (23') and the coulisse 21, (21').

The first, straight double arrow 32 identifies the vertical turning movement of the housing 12 with the saw blade 13 relative to the base plate 14 around the axis 16 for adjustment of the cutting depth. A second, curved double arrow 33 identifies the turning movement of the housing 12 with a saw blade 13 relative to the base plate 14 of the hand circular saw around the axis 30 for adjustment of the miter angle.

Figure 2:
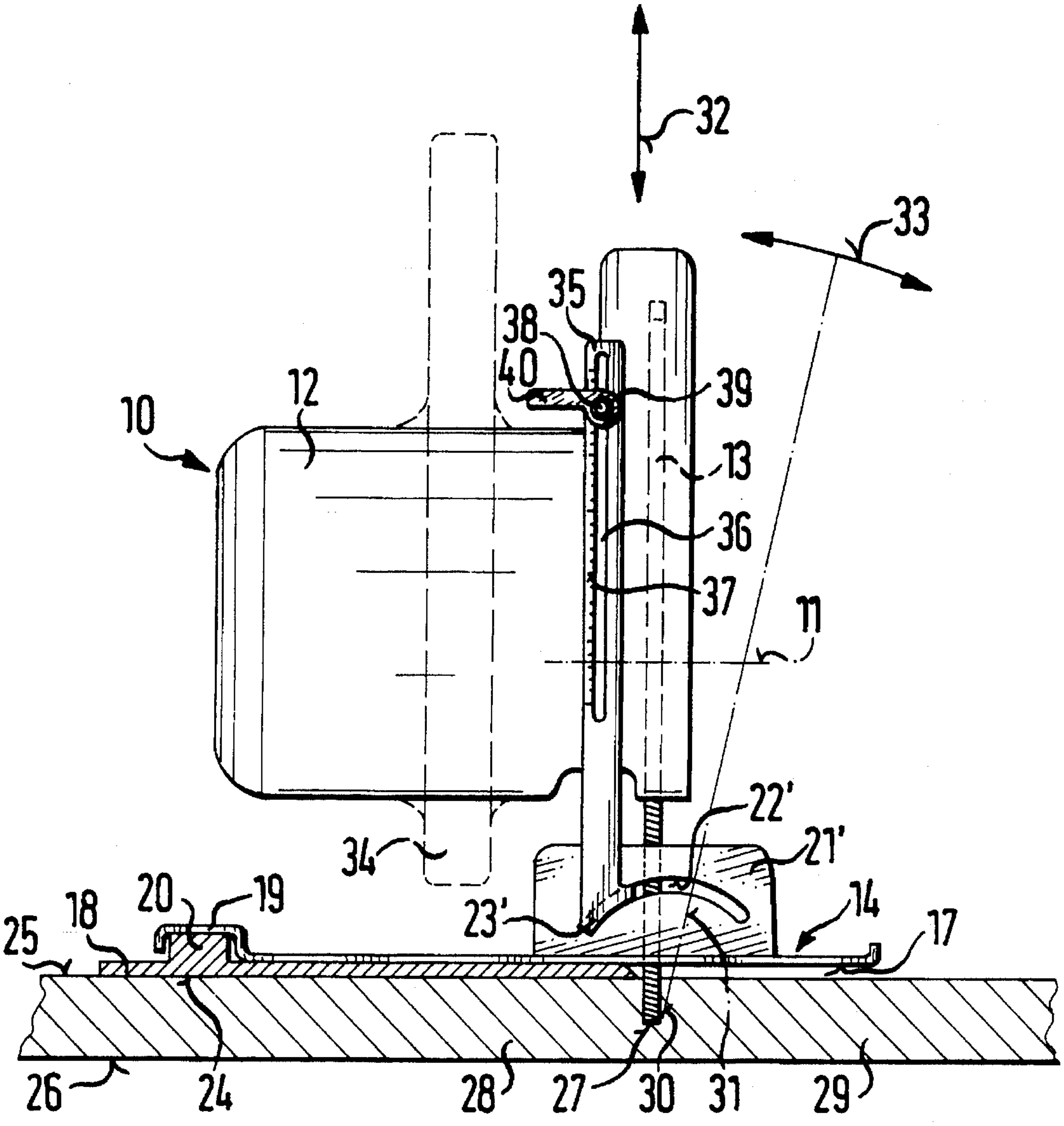
FIG. 2 is a view of the hand circular saw of FIG. 1 opposite to the displacement direction.

FIG. 2 shows a view of the hand circular saw 10 from behind with substantially the same parts as in FIG. 1. Instead of the pin baring with the axis 16, two coulisse blocks 23' and the contour of a handle 34 connected with a cutting depth guiding bracket 35 is visible in contrast to FIG. 1. It has a central guiding slot 36 as well as a scale 37. A screw bolt 38 is displaceably guided in the guiding slot 36. It is fixedly connected with the saw housing 12 and is clampable by a clamping nut 39 on the cutting depth guiding bracket 35. The clamping nut 39 is provided with a toggle-like actuating lever 40 which facilitates manual loosening and clamping.

The coulisses 21, 21' which are arranged in FIGS. 1 and 2 forwardly and rearwardly of the saw blade as considered transversely to the axis 11, with their circular arc-shaped guiding tracks 22, 22' in part to the coulisse blocks 23, 23' a movement around the turning axis 30. The greatest miter angle adjustable from the straight cut or 90° position amounts to conventionally to 45°–60°. The housing 12 of the hand circular saw 10 is turnable to the right in the observation direction until the coulisse 23' abuts against the end of the guiding track 22'.

Figure 3:
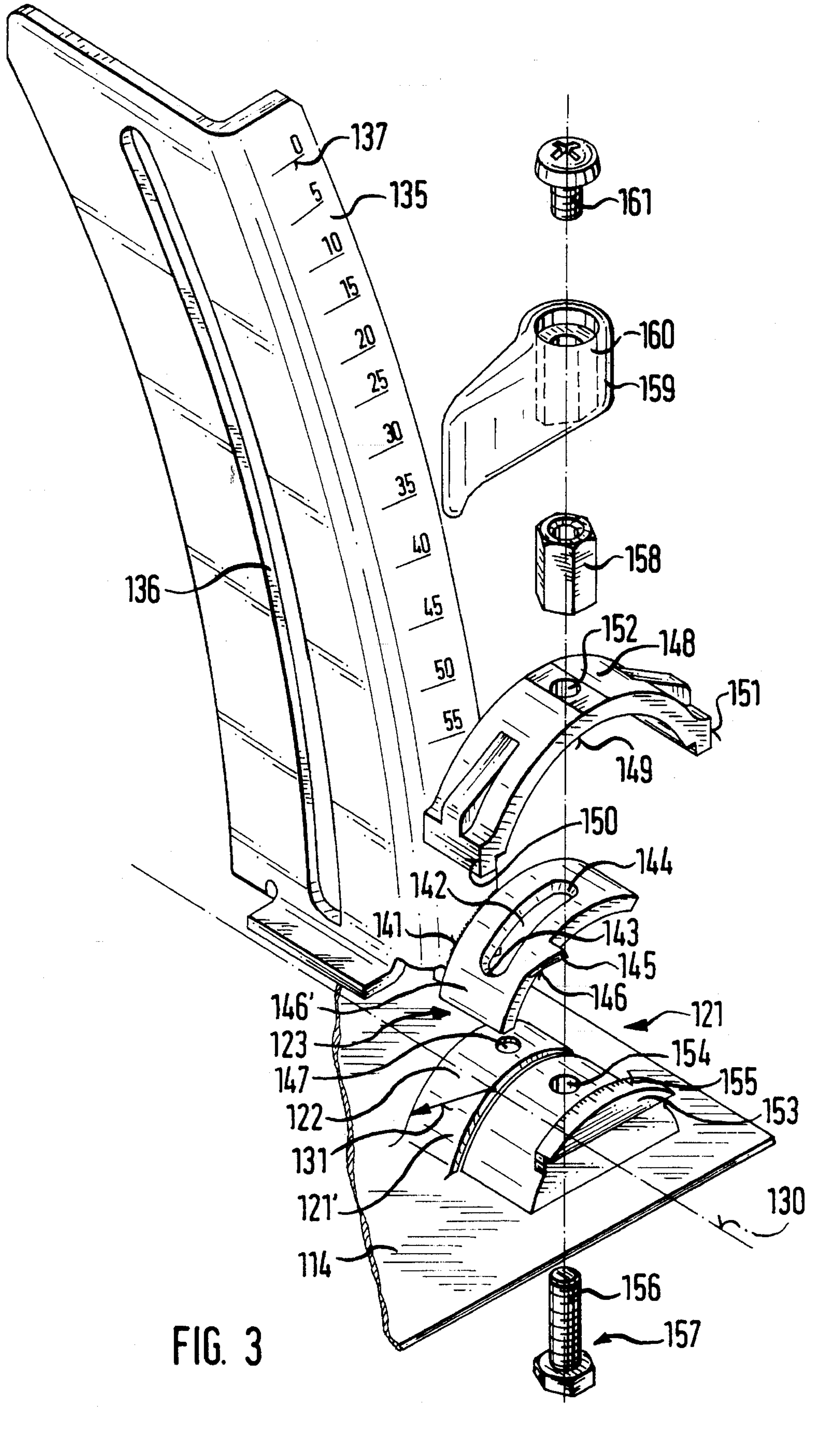
FIG. 3 is a view showing a section of a coulisse region and an explosion illustration of an embodiment of the hand circular saw in accordance with the present invention.

The concrete embodiment of the inventive hand circular saw shown in FIG. 3 is based on the same kinematic or geometrical principle as the diagram of FIGS. 1 and 2 illustrating the prior art, but is provided with new miter angle adjustment.

This drawings shows the details of a cutting depth guiding bracket 135 which is connected with the coulisses block 123 by a welding seam 141. The cutting depth guiding bracket 135 carries a central depth guiding slot 136, in which a not shown screw bolt connected with the not shown housing is guided.

The coulisse block 123 geometrically corresponds to a ring portion with a center point congruent with the turning axis 130. It is provided with a central slot 142 with two slot ends 143, 144 as well as with a projection facing the cutting depth guiding bracket 135 and operating as a pointer 145. A lower sliding surface 146 is arranged on a concave side of the coulisse block 123 facing the base plate 114. It is supported in a mounted condition on a guiding track 122 of the coulisse 121 which guiding track is curved convexly with the same radius of curvature. It is also formed as a ring portion. This coulisse part is formed from a sheet metal web 121' which is freely punched and upwardly pressed in the base plate 14. This part is shown offset in FIG. 3 laterally in the observation direction, in direction of the axis 130. The coulisse 121 carries a central, radial opening 147 which in the mounted condition in the 90° position of the cutting depth guiding bracket 135 coincides with the right slot end 144 of the coulisse block 123.

The upper, convexly curved sliding 146' of the coulisse block 123 is engaged by the concavely curved counter-guiding surface 144 of a clamping ring 148. Its left and right ends 150, 151 are supported perpendicularly on the base plate 144. Its central, radial opening 152 coincides with the right slot end 144 and with the opening 147 in the guiding coulisse 121.

A scale carrier 153 is arranged under the coulisse 121 and supported with its curved surface on the coulisse. It has a central, radial opening 154 and extends laterally. With its lower, straight surface displaceably on the base plate 114, so that it is non-releasably fixed also without the threaded bolt 156. Therefore, its opening 154 coincides with the opening 147 of the guiding coulisse 1125.

The scale carrier 153 carries at its edge a scale 155 for controlling the movement of the pointer 145 relative to the scale carrier 153 for adjustment of a miter angle. A threaded bolt 156 of a hexagonal head screw 157 extends through the openings 154, 147 and 144 and 152 which are in alignment with one another in the mounted condition. The hexagonal nut 158 which is supported from above against the clamping ring segment 148 is connected with the threaded bolt 156. A clamping lever 159 which operates as an actuating element for turning the hexagonal nut 158 engages the same with an inner hexagon 160. The clamping lever 159 is screwed with a mounting screw 161 axially on the hexagonal nut 158.

Depending on the position of the hexagonal nut 158, the clamping or arresting forces with which the coulisse block 123 is clamped between the clamping ring segment 148 and the guiding track 122 are lower or higher.

The threaded bolt 156 of the hexagonal head screw 157 serves as an abutment, The coulisse block 123 abuts against it with its slot ends 143 and 144 in the 90° or 45° miter angle adjustment of the cutting depth guiding bracket 135 and therefore prevents further turning.

The coulisse block 123 is guided in the coulisse 121 over the large surface at both sides, or in other words with its upper sliding surface 146' on the clamping ring segment 148 and with its lower sliding surface 146 on the guiding track 122 with an adjustable gap. In other words, the distance between the clamping ring segment 148 and the guiding track 122 forms an adjustable guiding gap 162, and the clamping ring segment 148 serves as a brake shoe.

The cutting depth guiding bracket 135 carries a scale 137 for adjustment of the cutting depth.

Figure 4:
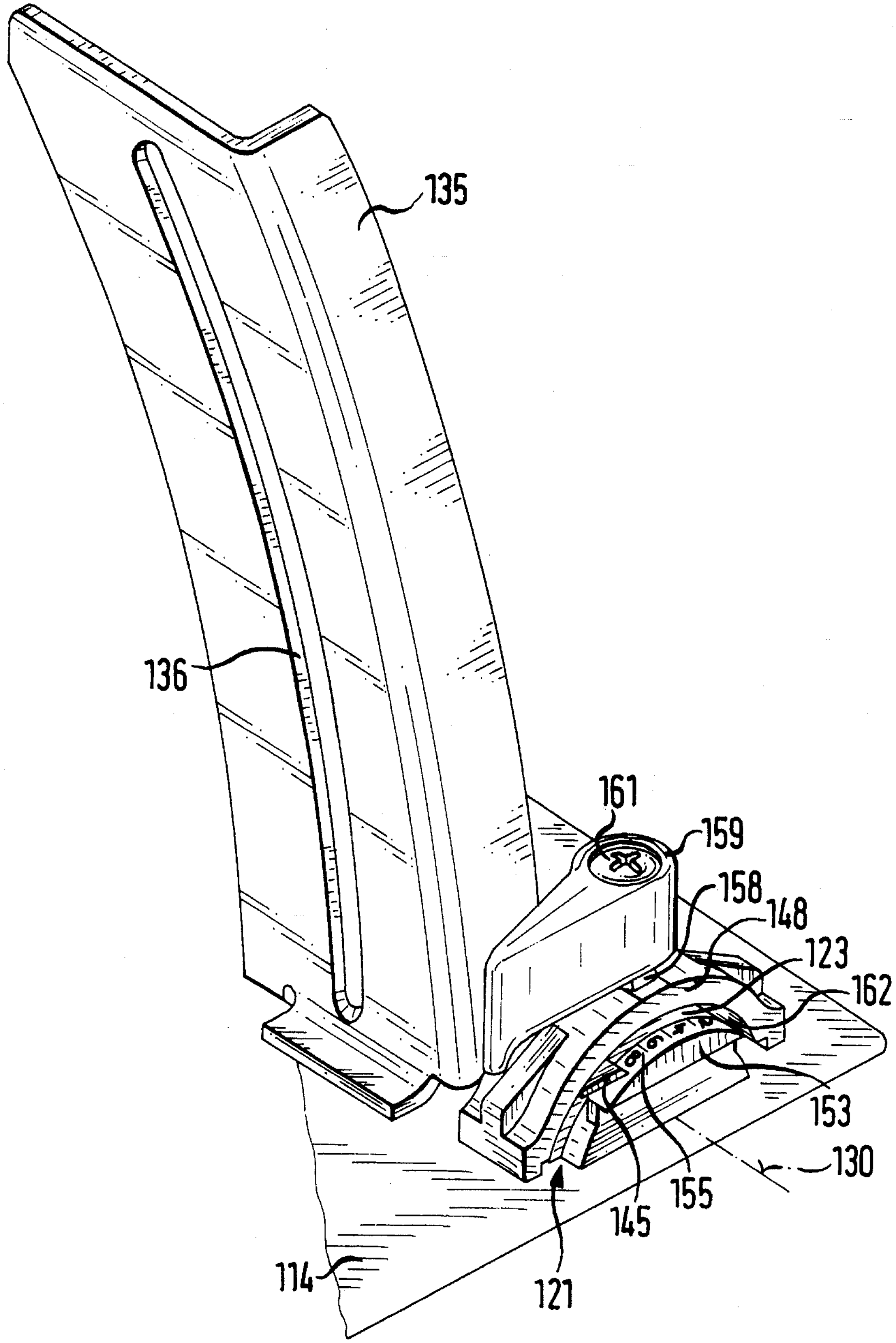
FIG. 4 is a view showing an assembly of the hand circular of FIG. 3.

The assembly drawing of FIG. 3 shown in FIG. 4 illustrates the compact construction of the coulisses 121 and good reading of the scale 155 relative to the pointer 145 from above. In cooperation with FIG. 3 this drawing shows the depth guiding slot 136, the pointer 145, the clamping ring portion 148, the scale carrier 153, the scale 155, the hexagonal nut 158, the clamping lever 159, and the mounting screw 161.

In a not shown embodiment of the invention the coulisse block is connected with a carrier bridge or the like, for example welded with it. The axis for adjustment of the cutting depth or the corresponding hinge of FIG. 1, for example a pin bearing 16 is arranged on it.

In accordance with a further not shown embodiment, the scale carrier operates as a guiding track itself.

A special advantage of the construction in accordance with the present invention is that the coulisse guide combines its guiding functions with a specially efficient indicating function for recognition of the miter angle and the clamping function, and the clamping means for adjusting the width of the guiding gap and in all miter angle positions maintains an unchangeable position.

In contrast to the round ring in the above presented description, a straight ring is a ring with a flat cylindrical outer surface.

It will be understood that each of the elements described above, or two or more together, may also find a useful application in other types of constructions differing from the types described above.

While the invention has been illustrated and described as embodied in a hand circular saw with swinging protective hood and miter angle adjusting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand circular saw, comprising a saw blade rotatable about a saw shaft axis; a housing which receives said saw shaft axis; a base plate which supports said housing and is movable with the latter, said housing being turnable relative to said base plate about two axes extending perpendicular to one another independently from one another and arrestable, said axis including a first axis which extends parallel to said saw shaft axis and operates for adjusting a cutting depth, and a second axis which extends both parallel to said base plate and to said saw blade and is used for adjustment of a miter angle; a coulisse determining a position of said second axis and having a circular arc-shaped guiding track and a coulisse block, said coulisse having a coulisse part which is fixedly connected with said base plate and has an upwardly curved ring portion which is also arranged on said base plate, said ring portion having a convex side which has said guiding track and has a center of curvature coinciding with said second axis used for adjustment of the miter angle.

2. A hand circular saw as defined in claim 1; and further comprising a cutting depth guiding bracket provided for adjusting the cutting depth.

3. A hand circular saw as defined in claim 1, wherein said track is formed by a strip-shaped web which is freely punched and pressed from said base plate and is of one piece with said base plate.

4. A hand circular saw as defined in claim 2, wherein a first one of said coulisse blocks carries said cutting depth guiding bracket and a second one of said coulisse blocks forms said first axis and is similar to said first coulisse block.

5. A hand circular saw as defined in claim 4, wherein said second coulisse block is formed as a hinge.

6. A hand circular saw as defined in claim 1, wherein said coulisse block has a width which is at least equal to a width of said guiding track.

7. A hand circular saw as defined in claim 1; and further comprising a body which is formed as a scale carrier and located under said coulisse part so as to extend laterally beyond said coulisse part between said coulisse part and said base plate non-releasably from said base plate, said body having a region extending outwardly beyond said base plate and supporting a scale.

8. A hand circular saw as defined in claim 7, wherein said body has the shape of a portion of a cylinder.

9. A hand circular saw as defined in claim 7, wherein said body has the shape of a portion of a ring.

10. A hand circular saw as defined in claim 7, wherein said coulisse block is formed as a ring portion composed of a sheet metal and provided laterally with a projection, said projection being formed as a pointer relative to said scale carrier.

11. A hand circular saw as defined in claim 7, wherein said coulisse block is formed as a ring portion composed of a sheet metal and provided laterally with a projection, said projection being formed as a pointer relative to said scale.

12. A hand circular saw as defined in claim 1; and further comprising arresting means for fixing said coulisse block relative to said base plate, said arresting means including a threaded bolt extending through said coulisse part slot in said coulisse block, said slot having slot ends so that said threaded bolt determines in cooperation with said slot ends a path of said coulisse block and therefore an adjustable region of the miter angle.

13. A hand circular saw as defined in claim 1; and further comprising a clamping ring portion which engages said coulisse block and together with said guiding track forms an adjustable guiding slot for guiding and arresting said coulisse block with an adjustable friction.

14. A hand circular saw as defined in claim 13; and further comprising means for adjusting a width of said guiding gap and including a threaded bolt and a nut releasably by a clamping lever.

15. A hand circular saw as defined in claim 14, wherein said means for adjusting a width of said guiding gap maintains an unchangeable position in all miter angle positions.

* * * * *